United States Patent
Nemati et al.

(10) Patent No.: US 12,182,415 B2
(45) Date of Patent: Dec. 31, 2024

(54) ENCODING SYSTEM DATA IN PARITY SYMBOLS

(71) Applicant: Microsoft Technology Licensing, LLC, Redmond, WA (US)

(72) Inventors: Majid Anaraki Nemati, San Diego, CA (US); Anthony Dwayne Weathers, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 17/848,774

(22) Filed: Jun. 24, 2022

(65) Prior Publication Data

US 2023/0359367 A1 Nov. 9, 2023

Related U.S. Application Data

(60) Provisional application No. 63/340,797, filed on May 11, 2022, provisional application No. 63/339,364, filed on May 6, 2022.

(51) Int. Cl.
*G06F 11/00* (2006.01)
*G06F 3/06* (2006.01)
*G06F 11/10* (2006.01)

(52) U.S. Cl.
CPC .......... *G06F 3/0619* (2013.01); *G06F 3/0638* (2013.01); *G06F 3/0673* (2013.01); *G06F 11/1032* (2013.01); *G06F 11/108* (2013.01)

(58) Field of Classification Search
CPC .. G06F 3/0619; G06F 3/0638; G06F 11/1032; G06F 11/108
See application file for complete search history.

(56) References Cited

U.S. PATENT DOCUMENTS

| | | | |
|---|---|---|---|
| 9,195,537 B2 | 11/2015 | Sharon et al. | |
| 9,274,887 B2 | 3/2016 | Post | |
| 10,459,793 B2* | 10/2019 | Bandic | G06F 11/1048 |
| 10,546,861 B2* | 1/2020 | Liu | H01L 29/0847 |
| 11,442,646 B2* | 9/2022 | Agarwal | G06F 3/0673 |
| 11,789,817 B2* | 10/2023 | Eisenhuth | G06F 3/0619 |
| | | | 714/764 |
| 11,822,814 B2* | 11/2023 | Kulkarni | G06F 3/0688 |
| 2013/0246878 A1 | 9/2013 | Pancholi et al. | |

(Continued)

FOREIGN PATENT DOCUMENTS

| | | |
|---|---|---|
| WO | 2021202277 A1 | 10/2021 |
| WO | 2021231120 A1 | 11/2021 |

OTHER PUBLICATIONS

"International Search Report and Written Opinion Issued in PCT Application No. PCT/US23/013564", Mailed Date: Jun. 16, 2023, 9 Pages.

(Continued)

*Primary Examiner* — Esaw T Abraham
(74) *Attorney, Agent, or Firm* — RAY QUINNEY & NEBEKER P.C.; Paul N. Taylor

(57) ABSTRACT

A RAM chip includes host dies and parity dies. A memory controller receives system data to be stored on the RAM chip that is in excess of the storage capacity of the host dies. The memory controller encodes the system data in the parity symbols of the parity dies. The system data is retrieved by decoding the parity symbols and identifying the system data from the decoded information.

20 Claims, 14 Drawing Sheets

(56) References Cited

U.S. PATENT DOCUMENTS

| | | | |
|---|---|---|---|
| 2018/0137005 A1* | 5/2018 | Wu ........................ | G11C 7/10 |
| 2018/0374548 A1 | 12/2018 | Achtenberg et al. | |
| 2021/0216402 A1 | 7/2021 | Xie et al. | |
| 2022/0075561 A1 | 3/2022 | Peltz et al. | |

OTHER PUBLICATIONS

Kunisa, Akiomi, "Host-Cooperative Metadata Embedding Framework", In Proceedings of the Third International Conference on Intelligent Information Hiding and Multimedia Signal Processing, Nov. 26, 2007, 4 Pages.

Manzhosov, et al., "MUSE: Multi-Use Error Correcting Codes", In Repository of arXiv:2107.09245v1, Jul. 20, 2021, 13 Pages.

* cited by examiner

ENCODING SYSTEM DATA IN PARITY SYMBOLS

CROSS-REFERENCE TO RELATED APPLICATIONS

This application claims priority to and the benefit of U.S. Provisional Patent Application No. 63/339,364, filed May 6, 2022 and U.S. Provisional Patent Application No. 63/340,797, filed May 11, 2022 which are hereby incorporated by reference in their entireties.

BACKGROUND

Random Access Memory (RAM) utilizes dies of memory devices to store data. The data stored in the dies may be subject to errors. Error correcting code (ECC) may be included in parity dies to perform error correcting functions and maintain parity of the data.

BRIEF SUMMARY

In some embodiments, a method for encoding data includes, at a memory controller, receiving host data from a host. Additional data is received from a system. The host data received from the host and the system data are encoded into one or more symbols. The symbols are stored in one or more parity devices.

In other embodiments, a method for decoding data includes, at a memory controller, receiving one or more parity symbols from one or more parity devices, the one or more parity symbols encoding host data and system data. The one or more parity symbols are used in decoding the host data and the system data.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 1-2 is a representation of RAM chips, according to at least one embodiment of the present disclosure;

FIG. 2 is a representation of a RAM chip, according to at least one embodiment of the present disclosure;

FIG. 3-1 is a representation of a die, according to at least one embodiment of the present disclosure;

FIG. 3-2 is a representation of a RAM chip including the architecture of the die of FIG. 3-1;

FIG. 4-1 is a representation of a die, according to at least one embodiment of the present disclosure;

FIG. 4-2 is a representation of a RAM chip including the architecture of the die of FIG. 4-1;

FIG. 5-1 is a representation of a die, according to at least one embodiment of the present disclosure;

FIG. 5-2 is a representation of a RAM chip including the architecture of the die of FIG. 5-1;

FIG. 6-1 is a representation of a die, according to at least one embodiment of the present disclosure;

FIG. 6-2 is a representation of a RAM chip including the architecture of the die of FIG. 6-1;

DETAILED DESCRIPTION

This disclosure generally relates to devices, system, and methods for data storage in random access memory (RAM). A RAM chip includes one or more host dies that store host data and parity information for ECC. The dies may be packaged in RAM chips containing on or more dies. The RAM chips may be mounted on a separate circuit board such as a dual inline memory module (DIMM). One possible implementation could designate specific RAM chips for host data and other chips for parity information. The host dies store information, such as data, code, or other information. The parity dies include parity information (stored as symbols) to help restore data to the host dies in the event of a loss of data. Put another way, if there is a loss of data in one or more of the host dies, the parity data stored in the parity dies may be used to restore the lost data.

In accordance with at least one embodiment of the present disclosure, system data (such as metadata or other additional data), in excess of the storage limits of the host dies, may be stored on the RAM chip. The system data may be encoded into the symbols stored on the parity dies. The system data is not directly stored on the host dies or the parity dies but is embedded in the symbols on the parity dies. This may allow for storage of additional information on the RAM chip while limiting the loss in the error correcting capabilities of the ECC.

Figure 1:
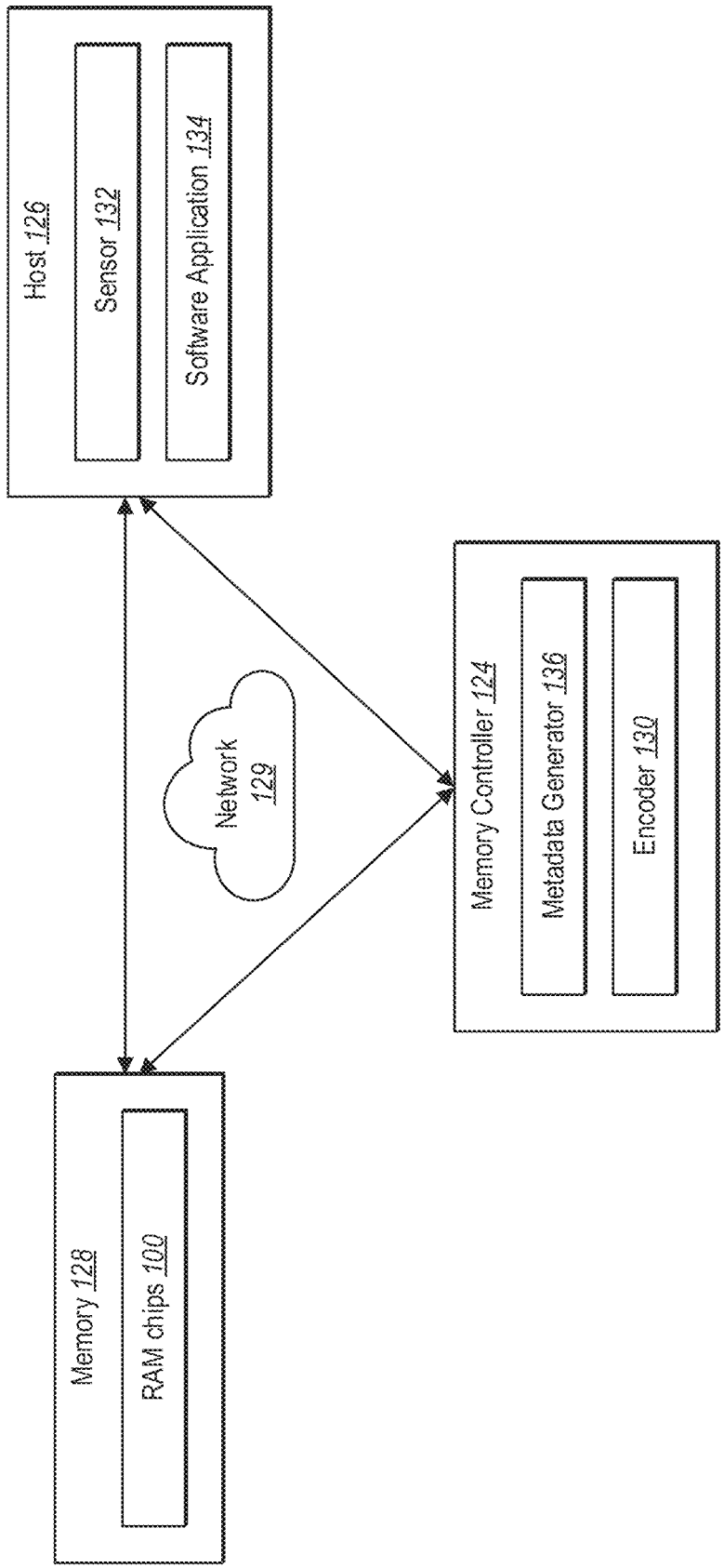
FIG. 1-1 is a representation of a memory controller system, according to at least one embodiment of the present disclosure.

FIG. 1-1 is a representation of a memory managing system 101, according to at least one embodiment of the present disclosure. The memory managing system 101 may include any type of computing system. For example, the memory managing system 101 may include a computing device, a server device, a networked computing device, a mobile device, a laptop computer, a desktop computer, a microchip, an integrated circuit, an ASIC, any other computing device, and combinations thereof. In some embodiments, each element of the memory managing system 101 may be located on the same computing device. In some embodiments, each element of the memory managing system 101 may be located on different computing devices. For example, the host 126 may be located at a different location than the memory 128 and/or the memory controller 124. The memory controller 124, host 126, and the memory 128 may be connected to each other over a network 129. The network 129 may be any network, such as the Internet, a local area network (LAN), a wireless area network (WAN), a company-based intranet, any other network, and combinations thereof.

The memory 128 includes one or more RAM chips 100. The memory 128 may store information on the RAM chip 100. As discussed herein, the RAM chips 100 may include host dies and parity dies. The host dies may store the information, and the parity dies may include ECC to correct any errors that occur in the host dies.

In some embodiments, the memory controller 124 may include an encoder 130. The encoder 130 may encode information on the RAM chip 100. For example, the memory controller 124 may receive information to store on the RAM chip 100, and the encoder 130 may convert the information into one or more codewords representative of the information stored across a set of host dies and parity dies. Encoding the information into the codeword may include any type of encoding process, including converting the information into a binary sequence storable on the host dies. For example, the encoder 130 may covert the information from the host data format received by the host into a storage format storable by the RAM chip 100. In some examples, encoding may include reducing a size of the data. In some examples, encoding may include changing a file format. In some examples, encoding may include any other process used to convert the data from the raw source data format into the codeword and/or a data storage format. The encoder 130 may further encode ECC to store on the parity dies. In this manner, if there is an error in the host dies (such as a corruption of a bit in the host dies), the ECC in the parity dies may restore the information in the host dies.

The memory controller 124 may store information in the RAM chip 100 that is received from the host 126. For example, the host 126 may include a sensor 132. The sensor 132 may detect a property (such as temperature, force, flow rate, acceleration, any other status, and combinations thereof) experienced by the host 126 and may transmit the detected property to the memory controller 124. The memory controller 124 may store the property in the RAM chip 100.

In some embodiments, the host 126 may provide the memory controller 124 with any information to store on the RAM chip 100. For example, the host 126 may include a software application 134 that produces information to be stored on the RAM chip 100. The host 126 may provide the information from the software application 134 to the memory controller 124, and the information may be stored on the RAM chip 100.

In some embodiments, the memory controller 124 may include a metadata generator 136. The metadata generator 136 may prepare additional information to be stored on the RAM chip 100. As used herein, "metadata" may include any additional information to be stored on the RAM chip 100. In some embodiments, the metadata may be related to the host information provided by the host 126. For example, the metadata may include a marker for the host information that identifies whether the host information includes an error. Indeed, in some embodiments, the metadata may be provided by the host 126. In some embodiments, the metadata may be generated by the metadata generator 136 and provided to the memory 128 by the memory controller 124. For example, the metadata may include one or more labels or identifiers of the memory 128, the host 126, or the memory controller 124. In some embodiments, the metadata may be related to the host information or host data stored on the RAM chip 100. In some embodiments, the metadata may be unrelated to the host information or host data stored on the RAM chip 100.

In some embodiments, the metadata to be stored on the RAM chip 100 may exceed the storage capacity (e.g., the maximum amount of bits that can be stored) of the RAM chip 100. As discussed herein, conventionally, the metadata may be stored by reserving one or more bits from the parity dies in the RAM chip 100 for metadata storage. However, in some cases there is a minimum number of bits that can be taken at a time. This may result in an excessive loss of parity for certain error types experienced by the RAM chip 100.

In accordance with at least one embodiment of the present disclosure, the encoder 130 of the memory controller 124 may encode the metadata into the codeword of the RAM chip 100. The codeword may then be shortened by not explicitly storing the metadata. In this manner, when the codeword of the RAM chip 100 is decoded, the metadata may be retrieved. By encoding the metadata into the codeword and storing it in the symbols of the RAM chip 100, the metadata may be stored on the RAM chip 100 with less loss of parity than by reserving a portion of the parity die for storage of the metadata. This may result in improved reliability when storing additional information on the RAM chip 100.

Figures 1, 2:
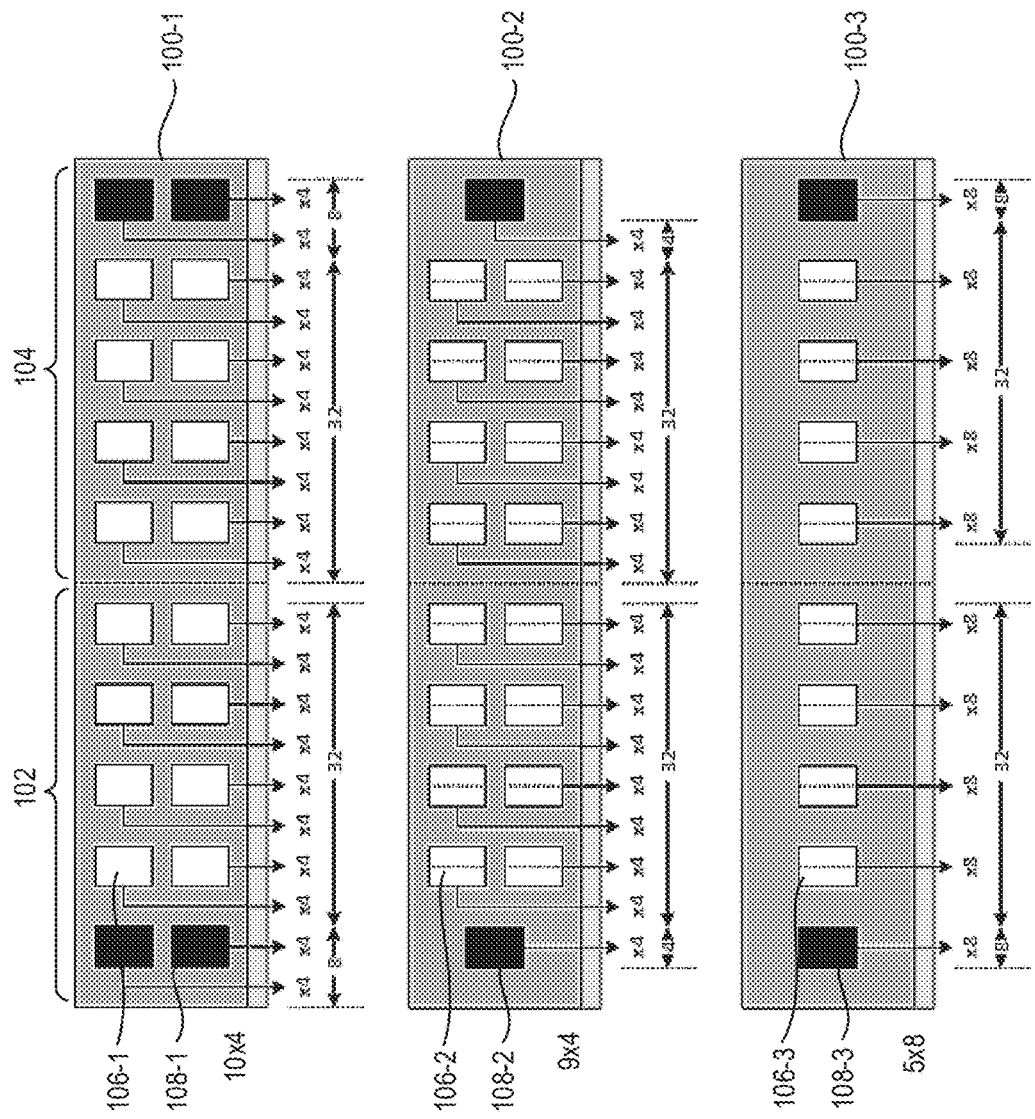
Figure 2:
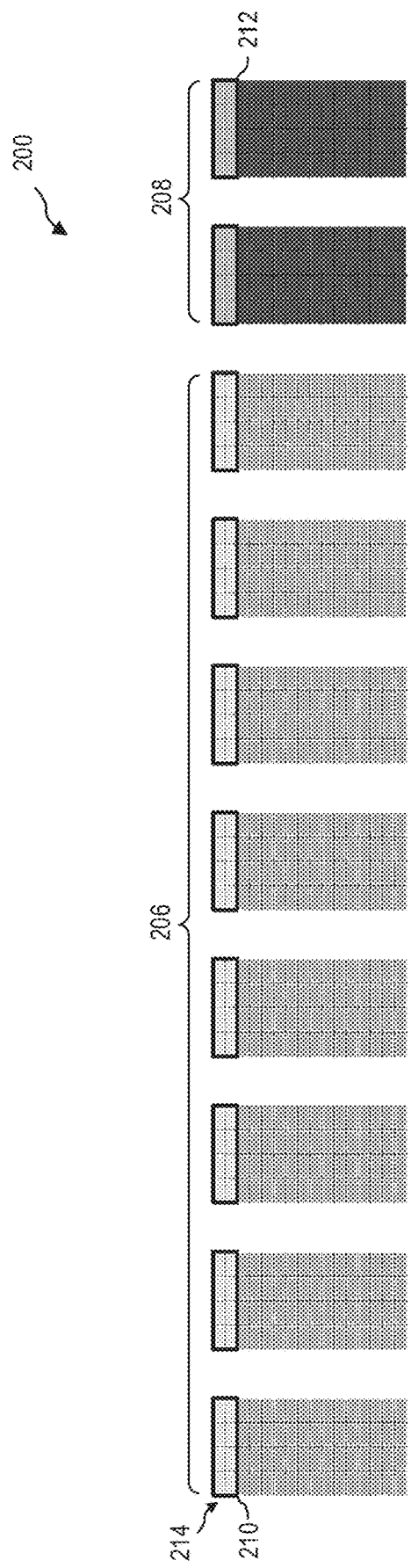

FIG. 1-2 is a schematic representation of three DIMMs (collectively 103) in three different configurations which may be managed by the memory controller 124 of FIG. 1-1. In some embodiments, the DIMMs 103 may be a part of the RAM chip 100 of FIG. 1-1. The DIMMs 103 are formed with a mirrored structure having a first half 102 and a second half 104. The first half 102 and the second half 104 shown have identical structure and architecture. To this end, when describing the DIMMs 103, only one half of the chip may be described. However, it should be understood that any other architecture than those shown may utilize at least one embodiment of the present disclosure.

A first DIMM 103-1 is set up in a 10×4 configuration, which includes 10 dies with 4 bits of storage capacity in each row of the die. The first DIMM 103-1 includes eight first host dies 106-1 (e.g., host devices, data devices) and two first parity dies 108-1 (e.g., parity devices). A host die, host device, parity die, parity device, or data device may include any storage device on a RAM chip. The die or device may include a block of semiconducting material on which a functional circuit is fabricated. Multiple dies may be linked together to form a chip. The first host dies 106-1 may store data from the host, and the first parity dies 108-1 may store ECC to perform error correcting functions for the data in the first host dies 106-1.

A second DIMM 103-2 is set up in a 9×4 configuration, which includes 9 dies with 4 bits of storage capacity in each row of the die. The second DIMM 103-2 includes eight second host dies 106-2 and one second parity die 108-2. The second host dies 106-2 may store data from the host and the second parity die 108-2 may store ECC to perform error correcting functions for the data in the second host dies 106-2. Error correcting functions may include any type of error correcting functions, such as automatic repeat request (ARQ), forward error correction (FEC), hybrid schemes, hash functions, check sums, minimum distance coding, any other type of error correcting functions, and combinations thereof.

A third DIMM 103-3 is set up in a 5×8 configuration, which includes 5 dies with 8 bits of storage capacity in each row of the die. The third DIMM 103-3 includes four third host dies 106-3 and one third parity die 108-3. The third host dies 106-3 may store data from the host and the third parity die 108-3 may store ECC to perform error correcting functions for the data in the third host dies 106-3.

The parity dies 108 may include ECC. For example, as will be discussed in further detail herein, the information stored on the host dies 106 may be encoded into symbols that are stored on the parity dies 108. In some embodiments, encoding may be any process in which information is stored in a pattern of bits. Encoding data, such as encoding parity data, may include creating a pattern of bits in the parity dies 108 that may check the accuracy of information stored in the host dies 106. As used herein, the term "encoding" may refer to any encoding mechanism. The ECC may use the parity dies 108 to correct errors in the host dies 106. For example, the ECC on the parity dies may include a Reed-Solomon (RS) code. In the 10×4 configuration of the first DIMM 103-1 shown, the ECC may use an RS (10,8,3) code, which means there are 10 total devices, 8 of which store data and a minimum distance of 3. This ECC guarantees that it can correct for any error in a single device.

As discussed herein, a memory controller may control the storage of data on the DIMMs 103. The memory controller may be in communication (e.g., have an electrical, optical, or data connection) with a host, a system, and the DIMMs 103. The memory controller may include instructions that are executable by the memory controller to perform the tasks described herein. The instructions may be further executable to perform additional functions, as described herein.

The host may send host data to the memory controller, and the memory controller may receive the host data from the host. The host data may be any type of data. For example, the host data may be sensor data, data for operating an operating system, data for operating a program, save data for a program, backup data, communication data, user data, system data, any other data, and combinations thereof. The memory controller may store the host data on the host dies 106. The memory controller may further generate one or more symbols from the host data to store as ECC on the parity dies 108. In some situations, the memory controller may receive additional data from a system (e.g., system data). The system data may include any data provided by the system, such as status data, metadata, data describing the host data, data for sorting or otherwise organizing the host data, any other system data, and combinations thereof. The system may instruct the memory controller to store the additional data on the DIMMs 103.

In some situations, the host dies 106 may not have sufficient memory capacity, storage allotment, and/or storage locations to store the system data. The memory controller may store the system data in the parity dies. For example, conventionally, the memory controller may store the system data as one or more bits in the parity dies. Put another way, the memory controller may "steal" or "borrow" memory from the parity dies 108 to store the system data. This may reduce the storage of the parity die on which ECC may be stored, thereby may degrading the error correcting capacity of the ECC. In some situations, while the system data may be a single bit, the single bit may consume a larger number of bits in the parity die 108. Thus, conventionally, while the system may ask for a single bit of extra memory, the memory controller may need to dedicate an entire symbol in the parity die 108 to the system bit, further reducing the error correcting capacity of the ECC.

In accordance with at least one embodiment of the present disclosure, the memory controller may embed or encode the system data into the ECC symbols stored on the parity die. The system data may not be directly stored on the parity dies or the host dies. The system data may be retrieved upon decoding of the symbols of the parity dies 108. In this manner, the system data may be "stored," or be recoverable upon decoding of the symbols of the parity dies.

FIG. 2 is a schematic of a RAM chip 200 in a 10×4 configuration having a plurality of host dies 206 and a plurality of parity dies 208. The host dies 206 shown are divided into a grid of 16 rows of 4 bits each. Each of the host dies 206 and the parity dies 208 may be separated into symbols. The host dies 206 may include host symbols 210 and the parity dies 208 may include parity symbols 212. A row of symbols along the RAM chip 200 may be a codeword 214. The codeword may be encoded into the parity symbols 212 stored in the parity dies 208.

A memory controller may receive host data from host and store the host data in the host dies 206. During operation of the RAM chip 200, errors may be introduced into the host dies 206. Depending on the type and/or pattern of error in the host dies 206, the ECC stored in the parity symbols 212 may correct the errors in the host dies 206. In the 10×4 configuration shown, two parity dies 208 may include ECC sufficient to recover from any error, including the loss of an entire host die 206.

As discussed herein, the memory controller may receive additional data (e.g., system data) from the system. The system data may not be storable in any of the parity symbols 212 of the host dies 206. Conventionally, the system data may be stored in one or more of the parity symbols 212 of the parity dies 208. However, the system data stored in the parity symbols 212 may reduce the error correcting capacity of the ECC. Indeed, the system data may tie up an entire parity symbols 212 of the parity dies 208. This may result in an entire parity symbols 212 being unavailable to store ECC, further reducing the error correcting capacity of the ECC.

In accordance with at least one embodiment of the present disclosure, the system data may be embedded or encoded in the parity symbols 212. For example, when the memory controller encodes the codeword 214 into the parity symbols 212, the memory controller may encode the system data as part of the codeword 214. In this manner, the system data may not be directly stored on the host dies 206 or the parity dies 208. To recover the system data, the memory controller may decode the parity symbols 212. The system data may reduce the error correcting capacity of the ECC in the parity symbols 212 by less than the loss in error correcting capacity caused by directly storing the system data on the parity dies 208.

Figures 1, 3:
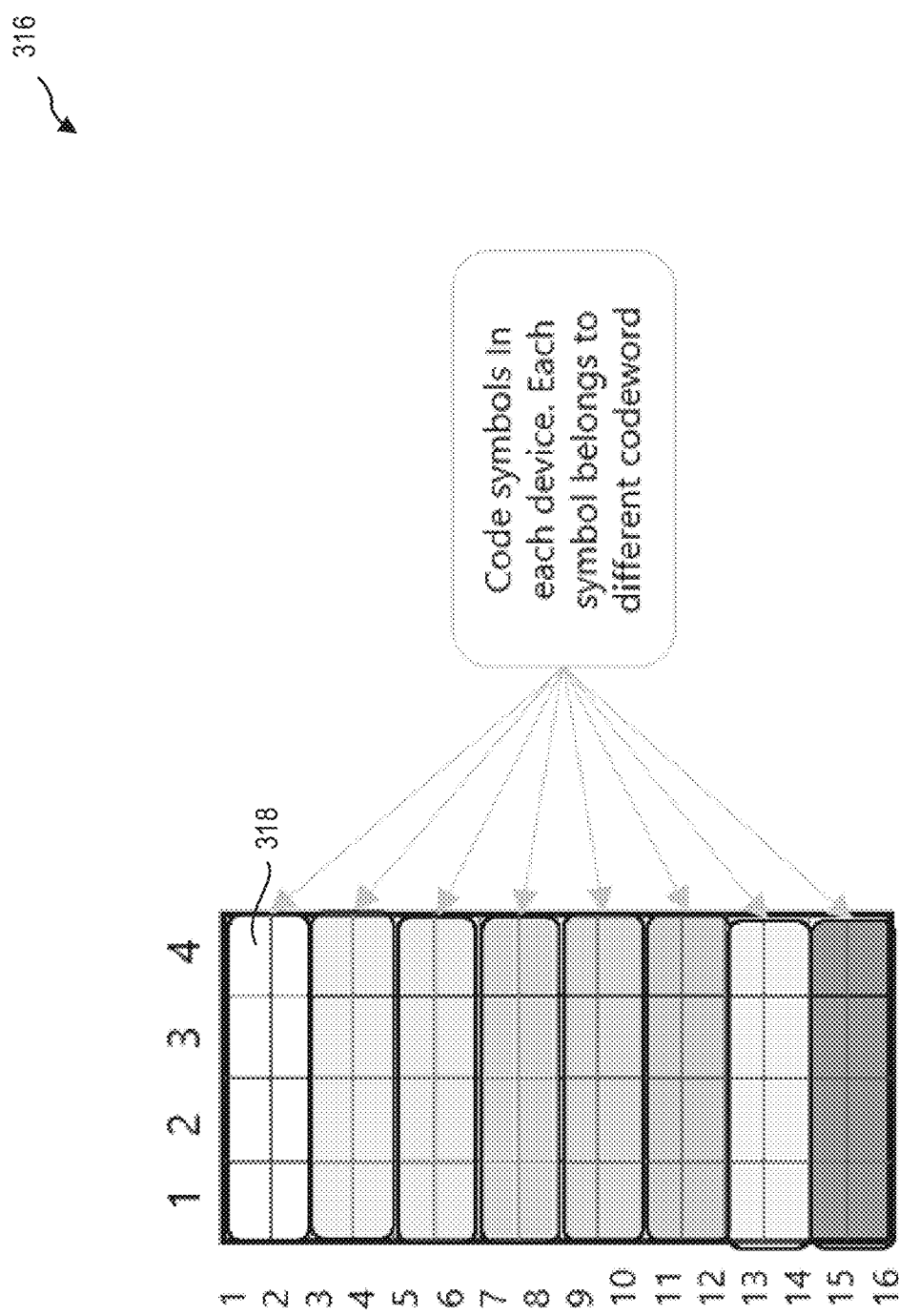
Figures 2, 3:
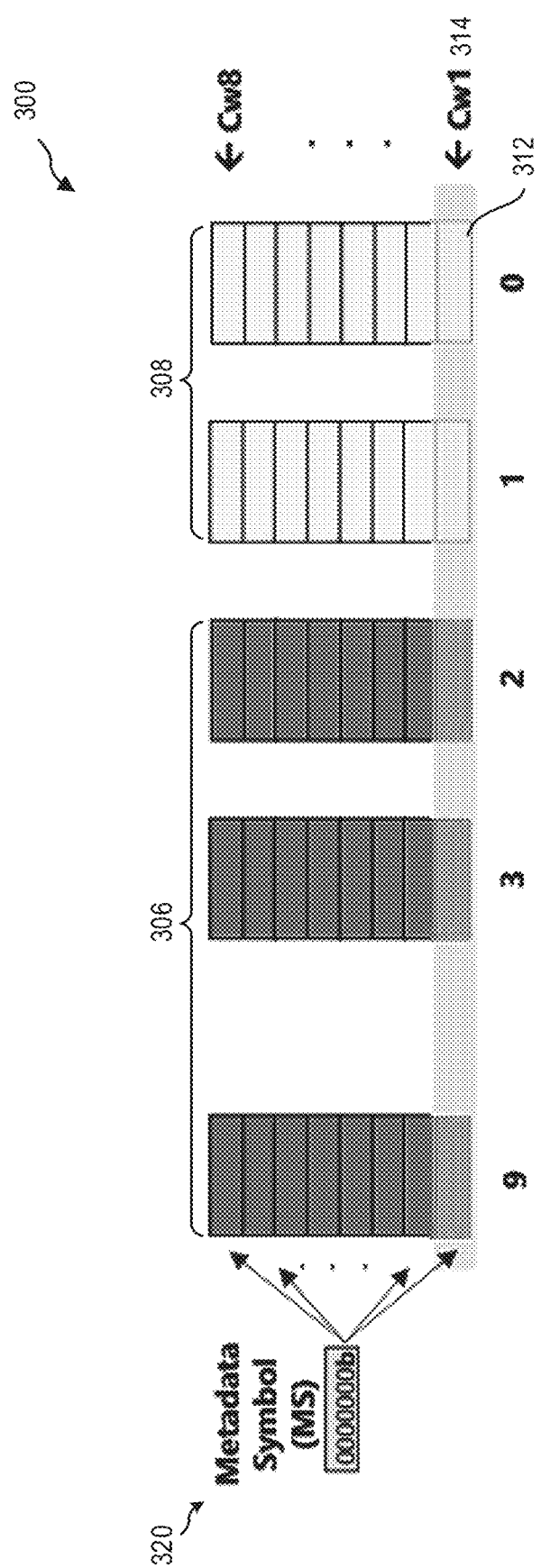

FIG. 3-1 is a representation of a die 316 having 16 rows of 4 bits each, according to at least one embodiment of the present disclosure. The die 316 shown includes eight symbols 318. The symbols 318 include 8 bits each, or two rows of four bits. However, it should be understood that the symbols 318 may include any other architecture, such as four rows of 2 bits, or one row of 8 bits, or any other architecture. In some embodiments, each of the symbols 318 may belong to a different codeword. As discussed herein, the codeword, including the symbols 318, may be encoded into a parity symbol.

In some embodiments, the die 316 may be a host die and host data may be stored in the symbols 318. In some embodiments, the die 316 may be a parity die and parity data may be stored in the symbols 318.

FIG. 3-2 is a representation of a RAM chip 300 having a plurality of dies having the architectural structure of the die 316 shown in FIG. 3-1. For ease of illustration, two parity dies 308 (e.g., dies 0 and 1) and three host dies 306 (e.g., dies 2, 3, and 9) are shown, with five dies (e.g., dies 4, 5, 6, 7, and 8) not shown. The host dies 306 and the parity dies 308 shown include eight die sets 314, each of which may be encoded with a codeword. The die sets 314 include host symbols 310 from the host dies and parity symbols 312 from the parity dies 308. The codewords of the die sets 314 are encoded into the parity symbols 312 to use as ECC. In the 10×4 RAM chip 300 shown, without any system data, there are 8 codewords of RS (10,8) ECC.

In accordance with at least one embodiment of the present disclosure, a memory controller may receive host data and system data 320 from a system. The memory controller may store the received host data in the host dies 306. The system may request that the memory controller store the system data 320 on the RAM chip 300. The system data 320 may be any type of data. For example, in the embodiment shown, the system data 320 may be a metadata symbol. In some examples, the system data 320 may be poison bit, or a bit configured to identify that the memory in the RAM chip 300 is corrupted. The system data 320 may include any size of data, including 1 bit, 2 bits, 3 bits, 4 bits, 8 bits, 16 bits, 32 bits, 64 bits, 128 bits, any other size, and combinations thereof.

As discussed herein, the host dies 306 may be full (e.g., the host dies 406 may have no storage capacity or no additional storage capacity). For example, the host dies 306 may not have any host symbols 310 with capacity, allocation, or availability to store the system data 320. The memory controller may embed the system data 320 within the parity symbols 312 of the parity dies 308. This may allow the system data 320 to be "stored," or be retrieved upon decoding of the parity symbols 312, without storing the system data 320 on either the host dies 306 or the parity dies 308.

To encode the system data 320 in the parity symbols 312, the memory controller may add the system data 320 as a symbol to generate an extended codeword for each of the die sets 314. For example, the system data 320 may be formed into a symbol, and the symbol may be added to the (host) data part of the codeword to form an extended data. When encoding into the parity symbols 312, the memory controller may include the system data 320 as a symbol, similar to the host symbols 310 of the host dies 306. This may result in the memory controller treating the RAM chip 300 as effectively having 11 total dies, with two parity dies. Each extended codeword may include 11 symbols. In this manner, the system data 320 may be encoded into the ECC of the parity dies without directly storing the system data 320 on the host dies 306 or the parity dies 308. For example, the ECC may be RS (11,9) in this configuration. When the memory controller stores the host data on the host dies 306, the memory controller may delete the system data from the extended codeword to form the die sets 314.

In some embodiments, encoding the system data 320 into the parity symbols 312 may reduce the number of the parity symbols 312. However, as discussed herein, the reduced parity may be less than that experienced when directly storing the system data 320 directly on the parity dies 308. For example, if the RAM chip 300 has 128-bit parity (e.g., two parity dies having 64 bits each (based on 16 rows of 4 bits per parity die 308)), storing the system data 320 directly on a parity die may occupy an entire parity symbols 312. In the embodiment shown, each symbol has 8 bits, so storing the system data 320 on a parity die 308 may reduce the parity of the RAM chip 300 from 128-bit parity to 120-bit parity. If the system data 320 is less than 8 bits, this may be a larger reduction in parity than the size of the system data 320.

In accordance with at least one embodiment of the present disclosure, encoding the system data 320 in the parity symbols 312 may superimpose the system data 320 over the information carried by the parity data in the parity symbols 312. In this manner, the system data 320 may be retrievable from the parity symbols 312 of the RAM chip 300 while reducing the loss in parity.

In some embodiments, after the memory controller receives and encodes the host data and the system data 320 on the RAM chip 300, the memory controller may delete the system data 320 from the controller memory of the memory controller. For example, the memory controller may not have capacity to indefinitely store the system data 320. Because the system data 320 is encoded in the parity symbols, the memory controller may erase the system data 320.

The reduced parity of the RAM chip 300 may result in patterns that may be uncorrectable. In accordance with at least one embodiment of the present disclosure, error probabilities for the parities discussed herein may be described in Table 1. The error probabilities in Table 1 are for the architecture shown in FIG. 3-1 and FIG. 3-2, having 8-bit symbols 8×RS(11,9). It should be understood that the error probabilities are illustrative, and that other probabilities, architectures, or ECC mechanisms may utilize the system data 320 encoding methodologies described herein. Table 2 outlines the un-correctable probabilities for device error patterns for the architecture shown in FIG. 3-1 and FIG. 3-2 having 8-bit symbols 8×RS(11,9).

TABLE 1

Sample error probabilities for the architecture shown in FIG. 3-1 and FIG. 3-2

| Parity Option | 1 Random error in cache line | | 2 Random errors in cache line | | 2 random errors on same chip | | Chip kill | |
| --- | --- | --- | --- | --- | --- | --- | --- | --- |
| | Uncorrectable | SDC | Uncorrectable | SDC | Uncorrectable | SDC | Uncorrectable | SDC |
| 128 bits | 0 | 0 | 0.1087 | 0.004 | 0 | 0 | 0 | 0 |
| 127 bits (Decoding twice) | 0 | 0 | 0.1087 | 0.004 | 0 | 0 | 5.03e−19 | 0 |

TABLE 2

Un-correctable error probabilities for device error patterns
for the architecture shown in FIG. 3-1 and FIG. 3-2

| Uncorrectable | Device error patterns | All bits for ECC (128 bits) | 127 bits |
|---|---|---|---|
| Random | 1b error | 0 | 0 |
| | 2b errors | 0 | 0 |
| | 3b errors | 0 | 0 |
| | 4b errors | 0 | 0 |
| Sub Device | Burst | 0 | 0 |
| | DQ | 0 | 5.03e−19 |
| | Any 2 DQ | 0 | 5.03e−19 |
| | Any two bursts | 0 | 0 |
| | Any 8 × 4 block (half device) | 0 | 0 |
| Full Device | chip kill | 0 | 5.03e−19 |

Figures 1, 4:
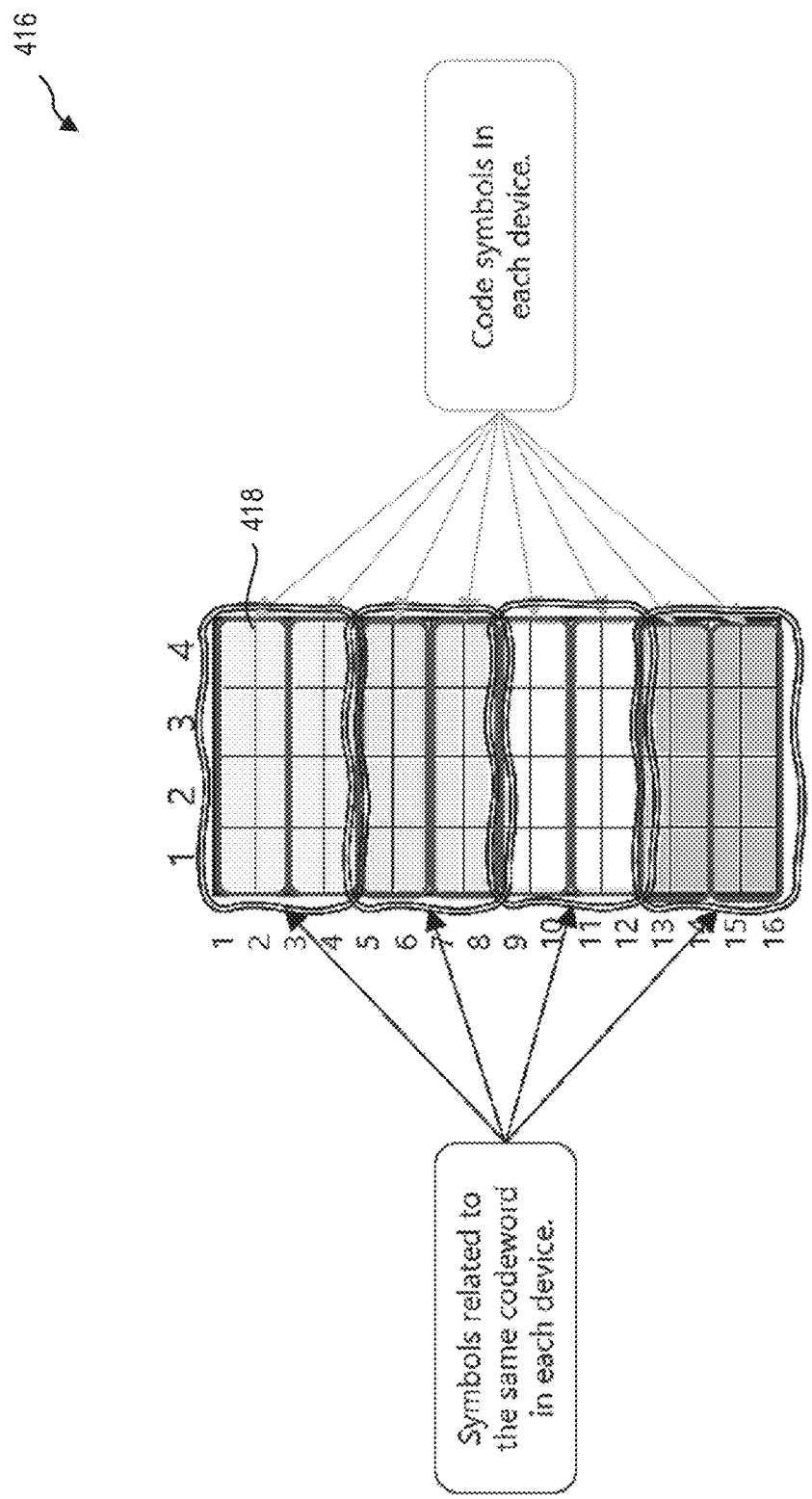
Figures 2, 4:
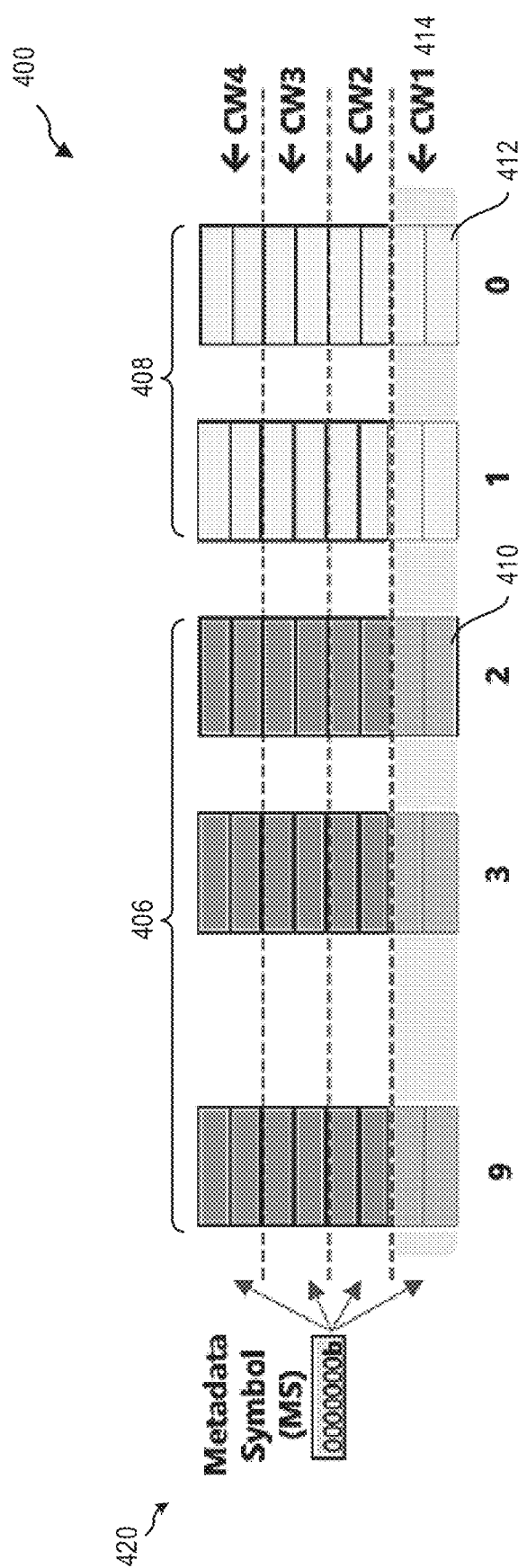

FIG. 4-1 is a representation of a die 416 having 16 rows of 4 bits each, according to at least one embodiment of the present disclosure. The die 416 shown includes eight symbols 418. The symbols 418 include 8 bits each, or two rows of four bits. However, it should be understood that the symbols 418 may include any other architecture, such as four rows of 2 bits, or one row of 8 bits, or any other architecture. In some embodiments, two of the symbols 418 may belong to a single codeword. As discussed herein, the codeword, including the symbols 418, may be encoded into a parity symbol.

In some embodiments, the die 416 may be a host die and host data may be stored in the symbols 418. In some embodiments, the die 416 may be a parity die and parity data may be stored in the symbols 418.

FIG. 4-2 is a representation of a RAM chip 400 having a plurality of dies having the architectural structure of the die 416 shown in FIG. 4-1. For ease of illustration, two parity dies 408 (e.g., dies 0 and 1) and three host dies 406 (e.g., dies 2, 3, and 9) are shown, with five dies (e.g., dies 4, 5, 6, 7, and 8) not shown. The host dies 406 and the parity dies 408 shown include four die sets 414, each of which includes a codeword. The four die sets 414 each include two host symbols 410 from the host dies and parity symbols 412 from the parity dies 408. The ECC for the codewords of the die sets 414 are stored in the parity symbols 412. In the 10×4 RAM chip 400 shown, without any system data, there are 4 die sets 414 of RS(20,16) ECC.

The memory controller may receive host data from a host and the system data 420 from a system. After receiving the host data, the memory controller may store the host data on the host dies 406. As discussed herein, the host dies 406 may be full (e.g., the host dies 406 may have no storage capacity or no additional storage capacity). For example, the host dies 406 may not have any host symbols 410 with capacity, allocation, or availability to store the system data 420. As discussed herein, the memory controller may embed the system data 420 within the parity symbols 412 of the parity dies 408. For example, the memory controller may generate ECC for an extended codeword including the host data and the system data and store the ECC on the parity symbols 412. This may allow the system data 420 to be "stored," or be retrieved upon decoding of the parity symbols 412, without storing the system data 420 on either the host dies 406 or the parity dies 408.

To encode the system data 420 in the parity symbols 412, the memory controller may add the system data 420 as a symbol or symbols to each of the codewords to form an extended codeword. When encoding the ECC of the extended codewords, the memory controller may include the system data 420 as a symbol or symbols, similar to the host symbols 410 of the host dies 406. This may result in the memory controller treating the RAM chip 400 as effectively having 21 total dies, with two parity dies. Each extended codeword may include 21 symbols. In this manner, the system data 420 may be encoded into the ECC of the parity dies without directly storing the system data 420 on the host dies 406 or the parity dies 408. For example, the ECC may be RS(21,17) in this configuration.

The reduced parity of the RAM chip 400 may result in patterns that may be uncorrectable. In accordance with at least one embodiment of the present disclosure, error probabilities for the parities discussed herein may be described in Table 3. The error probabilities in Table 3 are for the architecture shown in FIG. 4-1 and FIG. 4-2, having 8-bit symbols 4×RS(21,17). It should be understood that the error probabilities are illustrative, and that other probabilities, architectures, or ECC mechanisms may utilize the system data 420 encoding methodologies described herein. Table 4 outlines the un-correctable probabilities for device error patterns for the architecture shown in FIG. 4-1 and FIG. 4-2 having 8-bit symbols 4×RS(21,17).

TABLE 3

Sample error probabilities for the architecture shown in FIG. 4-1 and FIG. 4-2

| Parity Option | 1 Random error in cache line | | 2 Random errors in cache line | | 2 random errors on same chip | | Chip kill | |
|---|---|---|---|---|---|---|---|---|
| | Uncorrectable | SDC | Uncorrectable | SDC | Uncorrectable | SDC | Uncorrectable | SDC |
| 128 bits | 0 | 0 | 0 | 0 | 0 | 0 | 0 | 0 |
| 127 bits (Decoding twice) | 0 | 0 | 0 | 0 | 0 | 0 | 8.55e−18 | 0 |

TABLE 4

Un-correctable error probabilities for device error patterns
for the architecture shown in FIG. 4-1 and FIG. 4-2

| Uncorrectable | Device error patterns | All bits for ECC (128 bits) | 127 bits |
|---|---|---|---|
| Random | 1b error | 0 | 0 |
| | 2b errors | 0 | 0 |
| | 3b errors | 0 | 0 |
| | 4b errors | 0 | 0 |
| Sub Device | Burst | 0 | 0 |
| | DQ | 0 | 8.55e−18 |
| | Any 2 DQ | 0 | 8.55e−18 |
| | Any two bursts | 0 | 0 |
| | Any 8 × 4 block (half device) | 0 | 0 |
| Full Device | chip kill | 0 | 8.55e−18 |

Figures 1, 5:
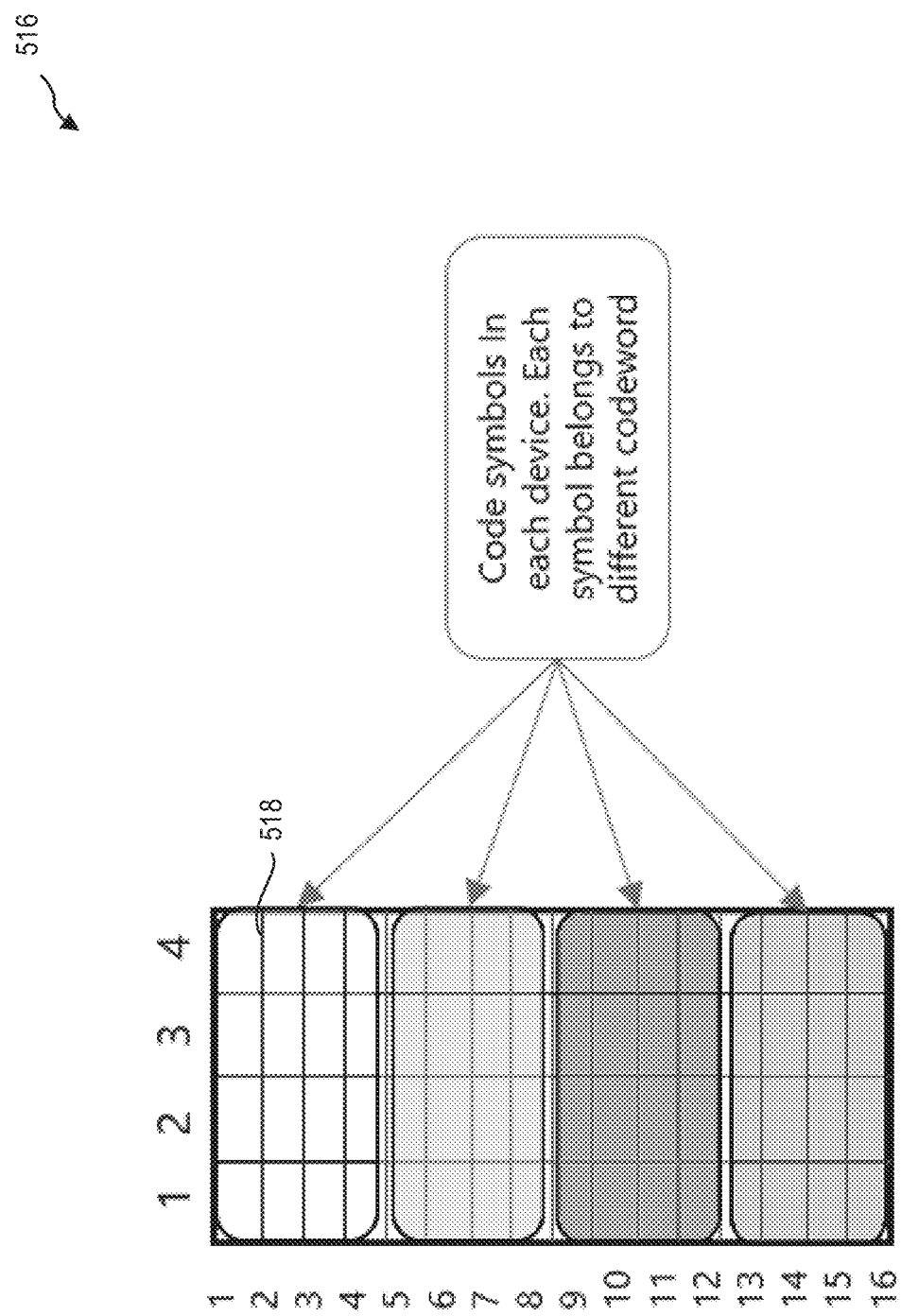
Figures 2, 5:
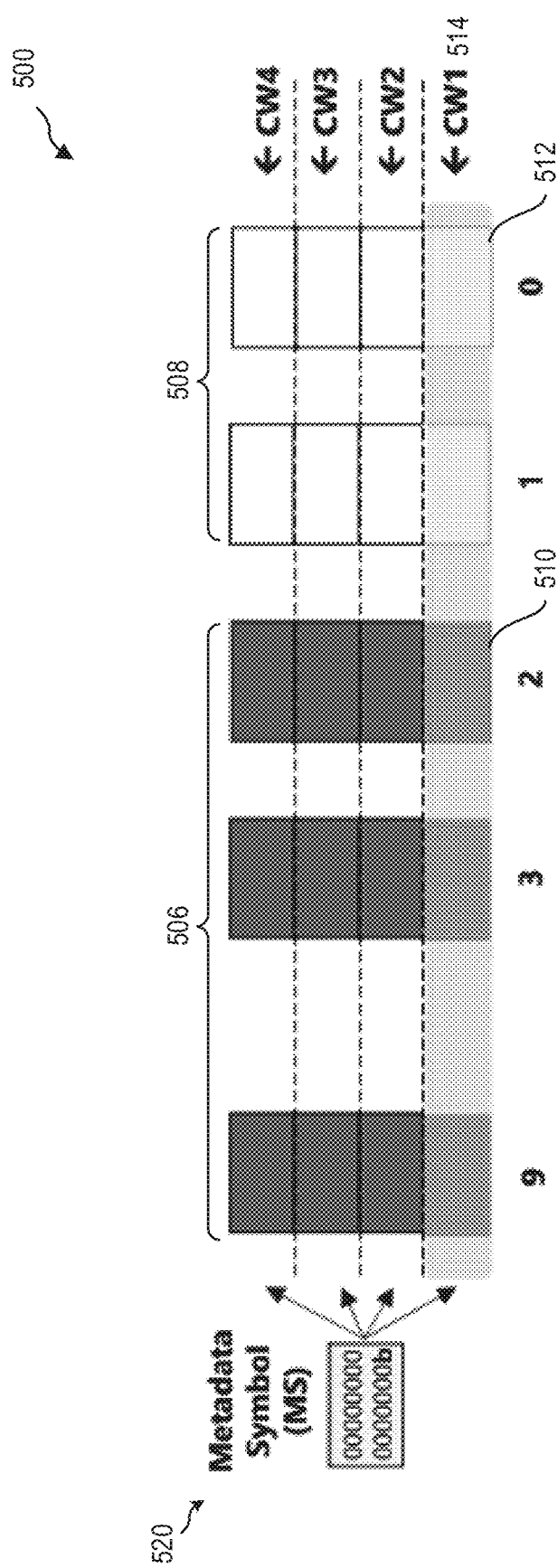

FIG. 5-1 is a representation of a die 516 having 16 rows of 4 bits each, according to at least one embodiment of the present disclosure. The die 516 shown includes eight symbols 518. The symbols 518 include 16 bits each, or four rows of four bits. However, it should be understood that the symbols 518 may include any other architecture, such as eight rows of 2 bits, or one column of 16 bits, or any other architecture. In some embodiments, one symbol 518 may belong to a single codeword. As discussed herein, the codeword, including the symbols 518, may be encoded into a parity symbol.

In some embodiments, the die 516 may be a host die and host data may be stored in the symbols 518. In some embodiments, the die 516 may be a parity die and parity data may be stored in the symbols 518.

FIG. 5-2 is a representation of a RAM chip 500 having a plurality of dies having the architectural structure of the die 516 shown in FIG. 5-1. For ease of illustration, two parity dies 508 (e.g., dies 0 and 1) and three host dies 506 (e.g., dies 2, 3, and 9) are shown, with five dies (e.g., dies 4, 5, 6, 7, and 8) not shown. The host dies 506 and the parity dies 508 shown include four die sets 514, each of which includes a codeword. The four codewords each include two host symbols 510 from the host dies and parity symbols 512 from the parity dies 508. ECC for the four codewords are stored in the parity symbols 512. In the 10×4 RAM chip 500 shown, without any system data, there are 4 codewords of 4×RS (10,8) codewords in GF(65536).

The memory controller may receive host data from a host and the system data 520 from a system. After receiving the host data, the memory controller may store the host data on the host dies 506. As discussed herein, the host dies 506 may be full (e.g., the host dies 406 may have no storage capacity or no additional storage capacity). For example, the host dies 506 may not have any host symbols 510 with capacity, allocation, or availability to store the system data 520. The memory controller may embed the system data 520 within the parity symbols 512 of the parity dies 508. This may allow the system data 520 to be "stored," or be retrieved upon decoding of the parity symbols 512, without storing the system data 520 on either the host dies 506 or the parity dies 508.

To encode the system data 520 in the parity symbols 512, the memory controller may add the system data 520 as a symbol or symbols to each of the codewords of the die sets 514. For example, the system data 520 may be formed into a symbol, and the symbol may be added to the codewords to form extended codewords. When developing ECC for the extended codewords for storage on the parity symbols 512, the memory controller may include the system data 520 as a symbol or symbols, similar to the host symbols 510 of the host dies 506. In this manner, the system data 520 may be embedded in the ECC of the parity dies without directly storing the system data 520 on the host dies 506 or the parity dies 508. For example, the ECC may be 4×RS(11,9) codewords in GF(65536) in this configuration.

The reduced parity of the RAM chip 500 may result in patterns that may be uncorrectable. In accordance with at least one embodiment of the present disclosure, error probabilities for the parities discussed herein may be described in Table 5. The error probabilities in Table 5 are for the architecture shown in FIG. 5-1 and FIG. 5-2, having 16-bit symbols 4×RS(11,9). It should be understood that the error probabilities are illustrative, and that other probabilities, architectures, or ECC mechanisms may utilize the system data 520 encoding methodologies described herein. Table 5 outlines the un-correctable probabilities for device error patterns for the architecture shown in FIG. 5-1 and FIG. 5-2 having 16-bit symbols 4×RS(11,9) in GF(65536).

TABLE 5

Sample error probabilities for the architecture shown in FIG. 5-1 and FIG. 5-2

| Parity Option | 1 Random error in cache line | | 2 Random errors in cache line | | 2 random errors on same chip | | Chip kill | |
|---|---|---|---|---|---|---|---|---|
| | Uncorrectable | SDC | Uncorrectable | SDC | Uncorrectable | SDC | Uncorrectable | SDC |
| 128 bits | 0 | 0 | 0.225 | 3.09e−05 | 0 | 0 | 0 | 0 |
| 127 bits (Decoding twice) | 0 | 0 | 0.225 | 3.09e−05 | 0 | 0 | 4.88e−19 | 0 |

TABLE 6

Un-correctable error probabilities for device error patterns for the architecture shown in FIG. 5-1 and FIG. 5-2

| Uncorrectable | Device error patterns | All bits for ECC (128 bits) | 127 bits |
|---|---|---|---|
| Random | 1b error | 0 | 0 |
| | 2b errors | 0 | 0 |
| | 3b errors | 0 | 0 |
| | 4b errors | 0 | 5.03e−20 |
| Sub Device | Burst | 0 | 0 |
| | DQ | 0 | 4.88e−19 |
| | Any 2 DQ | 0 | 4.88e−19 |
| | Any two bursts | 0 | 0 |
| | Any 8 × 4 block (half device) | 0 | 0 |
| Full Device | chip kill | 0 | 4.88e−19 |

Figures 1, 6:
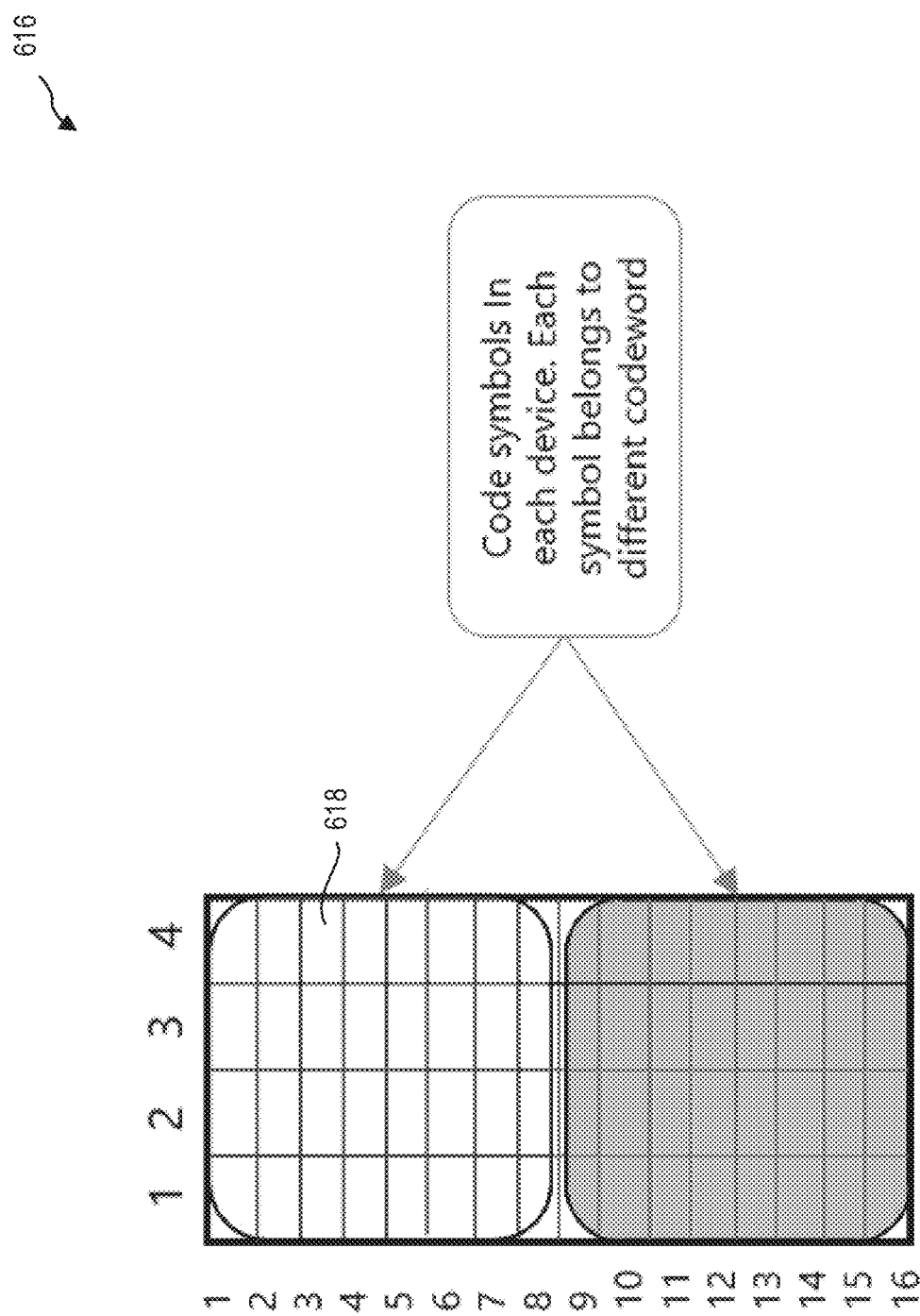
Figures 2, 6:
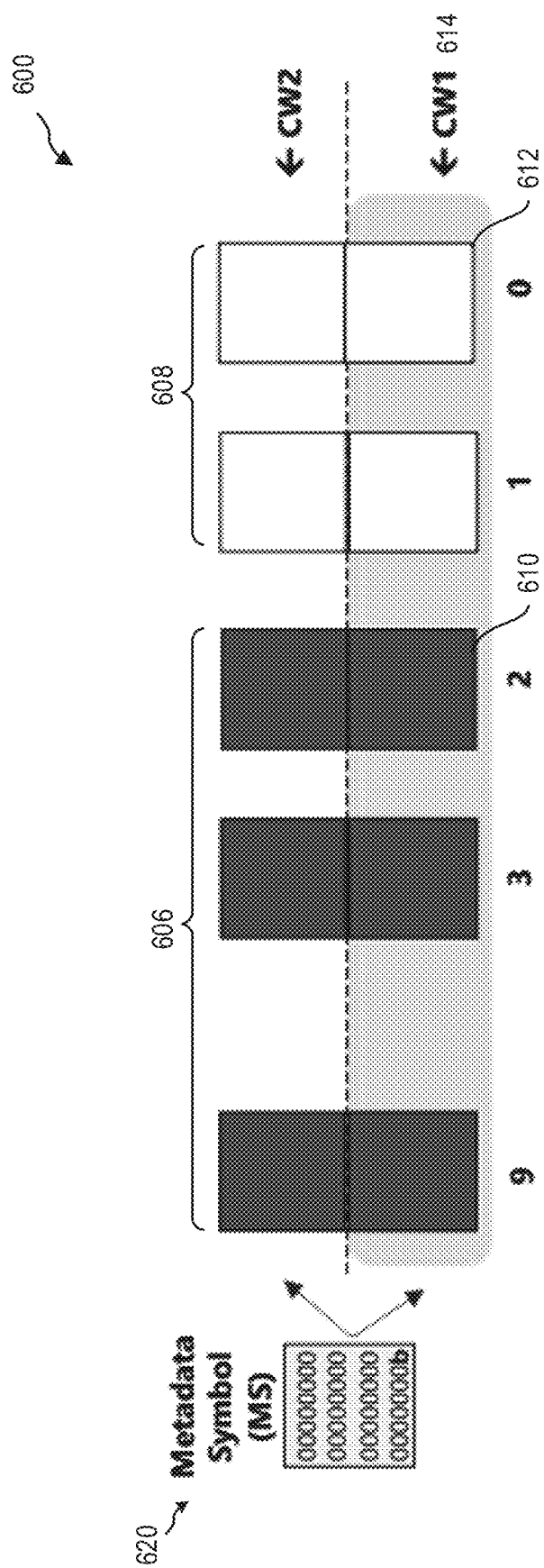

FIG. 6-1 is a representation of a die 616 having 16 rows of 4 bits each, according to at least one embodiment of the present disclosure. The die 616 shown includes eight symbols 618. The symbols 618 include 32 bits each, or eight rows of four bits. However, it should be understood that the symbols 618 may include any other architecture, such as 16 rows of 2 bits, or two columns of 32 bits, or any other architecture. In some embodiments, one symbol 618 may below to a single codeword. As discussed herein, the codeword, including the symbols 618, may be encoded into a parity symbol.

In some embodiments, the die 616 may be a host die and host data may be stored in the symbols 618. In some embodiments, the die 616 may be a parity die and parity data may be stored in the symbols 618.

FIG. 6-2 is a representation of a RAM chip 600 having a plurality of dies having the architectural structure of the die 616 shown in FIG. 6-1. For ease of illustration, two parity dies 608 (e.g., dies 0 and 1) and three host dies 606 (e.g., dies 2, 3, and 9) are shown, with five dies (e.g., dies 4, 5, 6, 7, and 8) not shown. The host dies 606 and the parity dies 608 shown include four die sets 614, each of which include a codeword. The four codewords each include two host symbols 610 from the host dies and parity symbols 612 from the parity dies 608. ECC for the four codewords are stored in the parity symbols 612. In the 10×4 RAM chip 600 shown, without any system data, there are 2 codewords of RS(10,8) codewords in GF(2^32).

The memory controller may receive host data from a host and the system data 620 from a system. After receiving the host data, the memory controller may store the host data on the host dies 606. As discussed herein, the host dies 606 may be full (e.g., the host dies 406 may have no storage capacity or no additional storage capacity). For example, the host dies 606 may not have any host symbols 610 with capacity, allocation, or availability to store the system data 620. The memory controller may embed the system data 620 within the parity symbols 612 of the parity dies 608. This may allow the system data 620 to be "stored," or be retrieved upon decoding of the parity symbols 612, without storing the system data 620 on either the host dies 606 or the parity dies 608.

To encode the system data 620 in the parity symbols 612, the memory controller may add the system data 620 as a symbol or symbols to each of the 4 codewords to form extended codewords. For example, the system data 620 may be formed into a symbol, and the symbol may be added to the codewords to form extended codewords. When preparing ECC for the extended codewords for storage on the parity symbols 612, the memory controller may include the system data 620 as a symbol or symbols, similar to the host symbols 610 of the host dies 606. In this manner, the system data 620 may be embedded in the ECC of the parity dies without directly storing the system data 620 on the host dies 606 or the parity dies 608. For example, the ECC may be RS(11,9) codewords in GF(2^32) in this configuration.

The reduced parity of the RAM chip 600 may result in patterns that may be uncorrectable. In accordance with at least one embodiment of the present disclosure, error probabilities for the parities discussed herein may be described in Table 7. The error probabilities in Table 7 are for the architecture shown in FIG. 6-1 and FIG. 6-2, having 16-bit symbols 4×RS(11,9). It should be understood that the error probabilities are illustrative, and that other probabilities, architectures, or ECC mechanisms may utilize the system data 620 encoding methodologies described herein. Table 8 outlines the un-correctable probabilities for device error patterns for the architecture shown in FIG. 6-1 and FIG. 6-2 having 32-bit symbols RS(10,9).

TABLE 8

Un-correctable error probabilities for device error patterns for the architecture shown in FIG. 6-1 and FIG. 6-2

| Uncorrectable | Device error patterns | All bits for ECC (128 bits) | 127 bits |
|---|---|---|---|
| Random | 1b error | 0 | 0 |
| | 2b errors | 0 | 2.48e−19 |
| | 3b errors | 0 | 3.72e−19 |
| | 4b errors | 0 | 4.33e−19 |
| Sub Device | Burst | 0 | 0 |
| | DQ | 0 | 4.88e−19 |
| | Any 2 DQ | 0 | 4.88e−19 |
| | Any two bursts | 0 | 4.88e−19 |
| | Any 8 × 4 block (half device) | 0 | 3.8e−19 |
| Full Device | chip kill | 0 | 4.88e−19 |

Figure 7:
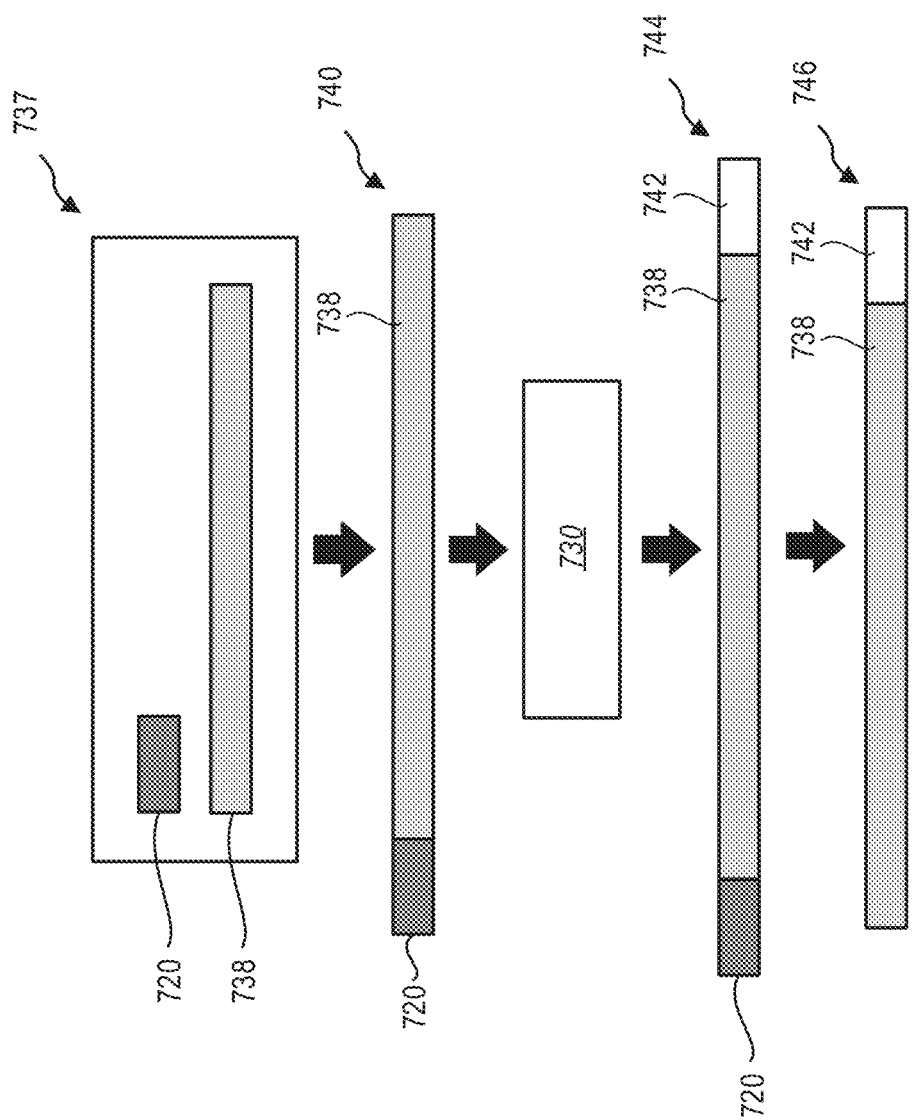
FIG. 7 is a representation of a flowchart for storing metadata or system data in a RAM chip, according to at least one embodiment of the present disclosure.

FIG. 7 is a flowchart illustrating storage of metadata or system data 720 in a RAM chip, according to at least one embodiment of the present disclosure. The flowchart shown in FIG. 7 may be implemented by the memory controller 124 of FIG. 1. Put another way, the memory controller 124 of FIG. 1 may store information on the RAM chip according to the flowchart of FIG. 7.

The memory controller may receive a block 737 of memory to be stored on a RAM chip. The block 737 of memory may include host data 738 and system data 720. The memory controller may determine that the block 737 of memory has a total size that is greater than the capacity of the RAM chip, or greater than a capacity of a block of dies allocated for storage of the information.

To store the block 737 of memory, the memory controller may generate an extended data block 740. The extended data block 740 may include the host data 738 with the system data 720 added to the host data 738. For example, the metadata or system data 720 may be added to the end of the host data 738, or to any other location in the host data 738.

An encoder 730 may encode the extended data block 740 into an extended codeword 744. The extended codeword 744 may include the information from the extended data block 740, including the system data 720 and the host data 738. The extended codeword 744 may further include a parity symbol 742. The encoder 730 may shorten the extended codeword 744 into a shortened codeword 746 by removing the system data 720. The shortened codeword 746 may include the host data 738 and the parity symbol 742, with the system data 720 encoded into the shortened codeword 746. The memory controller may then store the shortened codeword 746 in the RAM chip.

TABLE 7

Sample error probabilities for the architecture shown in FIG. 6-1 and FIG. 6-2

| Parity Option | 1 Random error in cache line | | 2 Random errors in cache line | | 2 random errors on same chip | | Chip kill | |
|---|---|---|---|---|---|---|---|---|
| | Uncorrectable | SDC | Uncorrectable | SDC | Uncorrectable | SDC | Uncorrectable | SDC |
| 128 bits | 0 | 0 | 0.4507 | 9.44e−10 | 0 | 0 | 0 | 0 |
| 127 bits (Decoding twice) | 0 | 0 | 0.4507 | 9.44e−10 | 2.48e−19 | 0 | 4.88e−19 | 0 |

To retrieve the system data 720 from the shortened codeword 746, the encoder may decode the shortened codeword 746. Because the ECC stored in the parity symbol 742 may be used to perform error correcting functions on the block 737, when the encoder 730 decodes the shortened codeword 746, the encoder 730 may identify the value of the system data 720 using the parity symbol 742. In this manner, the system data 720 may be encoded into the information stored on the parity symbol 742 and retrieved therefrom.

Figure 8:
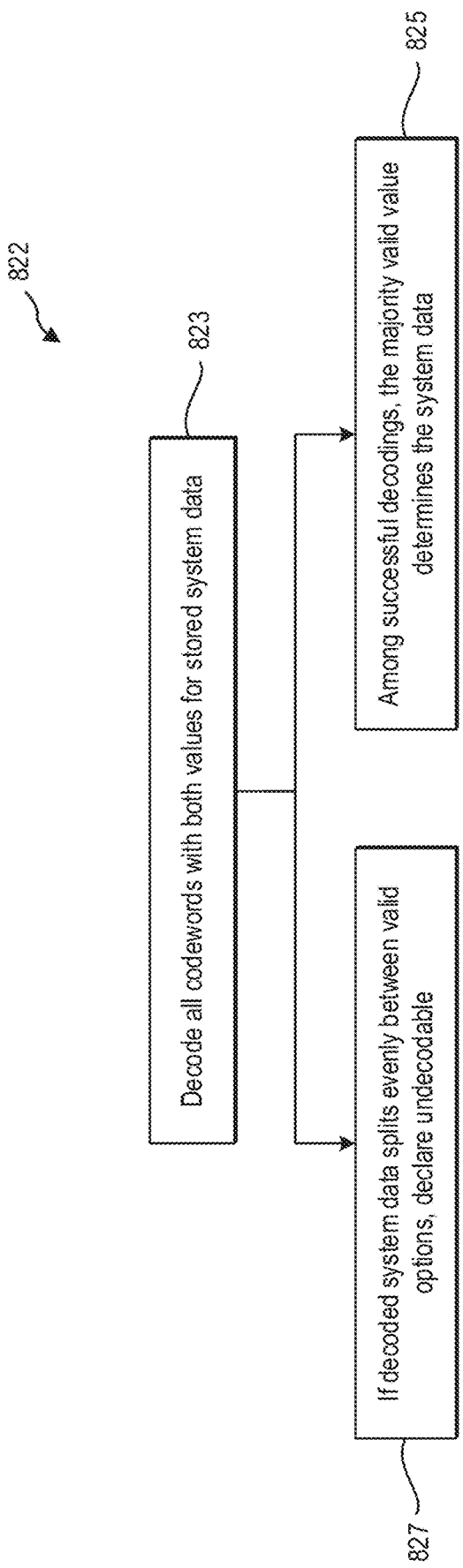
FIG. 8 is a representation of a flowchart of a method for decoding data, according to at least one embodiment of the present disclosure.
Figure 9:
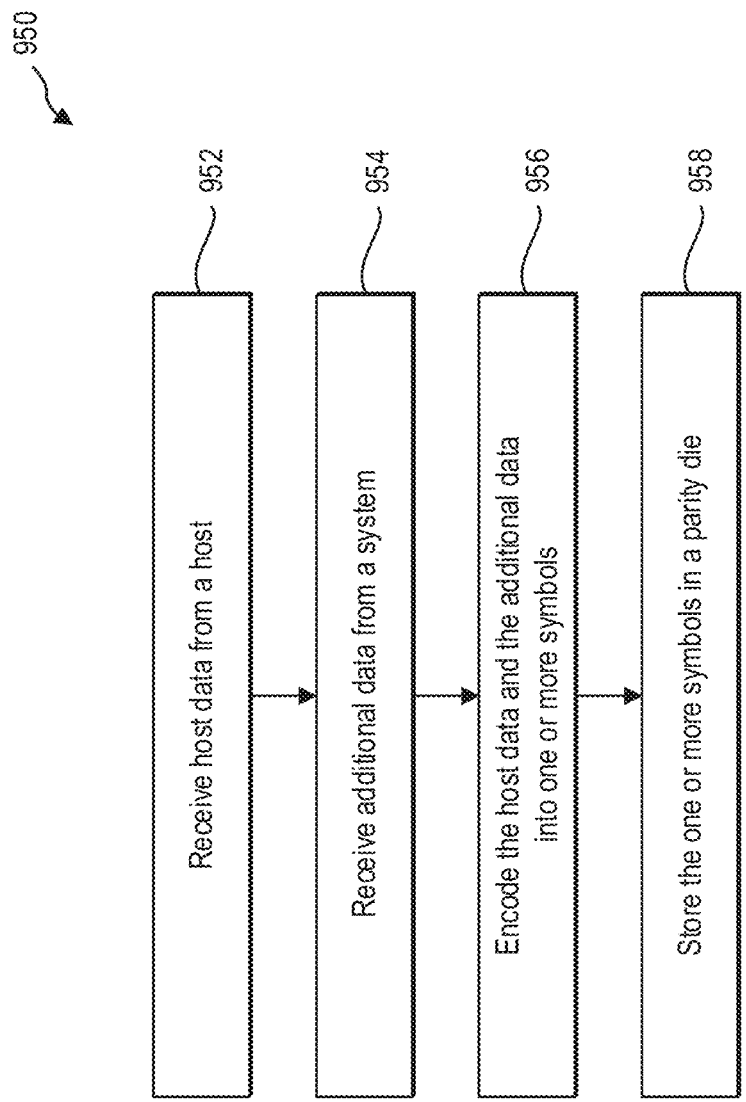
FIG. 9 is a representation of a flowchart of a method for encoding data, according to at least one embodiment of the present disclosure.

FIGS. 8 and 9, the corresponding text, and the examples provide a number of different methods, systems, devices, and non-transitory computer-readable media of the memory managing system 101. In addition to the foregoing, one or more embodiments can also be described in terms of flowcharts comprising acts for accomplishing a particular result, as shown in FIGS. 8 and 9. FIGS. 8 and 9 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts or a method 822 for decoding data in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

The method 822 may include decoding all the codewords and parity symbols, including encoded system data and encoded host data. The method 822 may include decoding all codewords with both values for the stored system data at 823. encoded host data and decoding the encoded system data. Each of the codewords and parity symbols may be decoded with each bit option for the system data (e.g., with both a 0 value and a 1 value for the system data). This may result in one or more un-decodable results. Among the successful decodings, the majority (e.g., greater than 50%) of valid values for the decoded system data may determine the value of the system data at 825. If the decoded values have equally split values, then the codeword may be declared undecodable at 827.

For example, the decoder may decode the system data from the extended codeword. Decoding the system data may include decoding the ECC from the parity symbol. In some embodiments, the decoding the system data may include decoding the system data from the ECC stored in each parity die. Because the ECC stored in the parity die covers the extended codeword, the system data may be decoded from the ECC.

In some embodiments, the system data for each extended codeword may be decoded. The memory controller may review the decoded system data. In some embodiments, the decoded system data may have different system data values between extended codewords, which may be a result of corruption of data or other data losses. In some embodiments, the decoded system data may be invalid (e.g., the decoded system data may be undecodable). If decoded system data is invalid or undecodable, then the memory controller may ignore, flag, or not review the invalid system data and/or the corresponding host data.

In accordance with at least one embodiment of the present disclosure, if the memory controller decodes multiple different system data values, then the memory controller may compile a quantity of each system data values (e.g., compile a quantity of system data values of 0 and a quantity of system data values of 1). The memory controller may identify a majority of valid system data values from these quantities. In some embodiments, the memory controller may determine that the majority of valid system data values is correct. Put another way, the memory controller may determine that the majority of valid system data values is the true value of the system data. A majority of system data values may be based on whichever value of the system data value has a larger number of votes. In some embodiments, the memory controller may, if there is no majority of valid system data values, declare the system data undecodable. There may be no majority of system data values if there is a tie in the quantity of valid system data values, or if there are no valid system data values. Declaring the system data undecodable may result in a loss of the system and/or host data.

This decoding method may be referred as double decoding because the codeword may be decoded with both system data=0 and system data=1. In double decoding, many operations are shared in the two decoders because all symbols except the metadata symbol are the same. For example, in syndrome calculation both decoders share a large percentage of the process and repetition can be avoided if both decoders use the same result.

Note that RS(11,9) cannot successfully decode and correct 2 symbol errors, e.g., when there are two error symbols, and there is no error location information. In such an event, since the min distance is 3, there is a possibility that these two errors happen in a way that the CW read is one symbol away from another valid codeword. Therefore, the RS decoder corrects it to an incorrect yet valid codeword. In some embodiments, in such a case, the decoder may not be able to decode the errors and claim an undecodable codeword.

If there is no additional metadata, i.e., 128-bit parity, the algorithm uses the same structure as above with default system data=0. Therefore, effectively there are 8 codewords of RS(10, 8). At the decoder, since we know the only possibility is system data=0, system data=1 is not considered and decoding becomes easier (double decoding is not necessary).

As mentioned, FIG. 9 illustrates a flowchart of a series of acts or a method 950 for encoding data in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

A memory controller may receive host data from a host at 952. The memory controller may receive additional data (such as metadata) from a system at 954. An encoder on the memory controller may encode the host data and the additional data into one or more symbols at 956. The one or more symbols may be stored on a parity die of a RAM chip at 958.

In accordance with at least one embodiment of the present disclosure, the encoder may prepare an extended codeword that includes both the host data and the additional data. Encoding the host data and the additional data into one or more symbols may include preparing ECC for the extended codeword. The ECC may be stored as a parity symbol in the parity die. When the host data is stored in the host dies, the additional data may be deleted from or removed from the host data. In this manner, the additional data may be stored in the parity data without specifically reserving a portion of the parity die to store the additional data.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for encoding data, comprising:
    at a memory controller for a RAM chip, the RAM chip including one or more data dies and one or more parity dies:
        receiving host data from a host, the host data having a host size that is equal to a memory capacity of the one or more data dies of the memory controller;
        receiving system data from a system, the system data different than the host data, wherein the system data plus the host data exceeds the memory capacity of the one or more data dies;
        encoding the host data received from the host and the system data received from the system into one or more symbols; and
        storing the one or more symbols in the one or more parity dies.

2. The method of claim 1, wherein the system data received from the system is not directly stored in the one or more parity dies.

3. The method of claim 1, further comprising storing the host data in the one or more data dies of the RAM chip.

4. The method of claim 3, wherein the system data is not directly stored in the one or more data dies.

5. The method of claim 1, wherein the one or more parity dies include error correcting code for an extended codeword, the extended codeword including the host data and the system data.

6. The method of claim 1, further comprising, after encoding the host data and the system data into the one or more symbols, deleting the system data.

7. A method for encoding and decoding data, comprising:
    the method of encoding data of claim 1; and
    at a memory controller for a RAM chip, the RAM chip including one or more parity dies and one or more host dies:
        receiving one or more parity symbols from the one or more parity dies, the one or more parity symbols having error correcting code (ECC) with system data encoded in the ECC; and
        decoding the system data from the ECC.

8. The method of claim 7, wherein the system data is not stored on the one or more parity dies.

9. The method of claim 7, wherein decoding the system data includes decoding an extended codeword from the ECC, the extended codeword including host data stored on the one or more host dies and the system data.

10. The method of claim 9, wherein the RAM chip includes a plurality of die sets, each die set including at least one host die and at least one parity die, wherein each die set includes an extended codeword, and wherein the system data is encoded into the extended codeword of each die set.

11. The method of claim 10, wherein decoding the system data includes decoding the extended codeword and determining a system data value for the system data, and further comprising determining that a majority of valid system data values is correct.

12. The method of claim 11, further comprising, if there is no majority of valid system data values, declaring the data undecodable.

13. The method of claim 1, wherein the system data includes a marker for the host data that identifies whether the host data includes an error.

14. The method of claim 1, wherein the system data includes a label of the host data.

15. A device for storing data, comprising:
one or more data dies;
one or more parity dies; and
a controller in communication with the one or more data dies and the one or more parity dies, the controller including instructions executable to:
receive host data from the one or more data dies, the host data having a host size that is equal to a memory capacity of the one or more data dies;
receive system data from a system, the system data different than the host data, wherein the system data plus the host data exceeds the memory capacity of the one or more data dies;
encode the host data received from the one or more data dies and the system data received from the system into one or more symbols; and
storing the one or more symbols in one or more parity dies.

16. The device of claim 15, wherein the system data received from the system is not directly stored in the one or more parity dies.

17. The device of claim 15, wherein the instructions are further executable to store the data in the one or more data dies.

18. The device of claim 17, wherein the system data is not directly stored in the one or more parity dies.

19. The device of claim 15, wherein the instructions are further executable to perform error correcting functions with the one or more symbols in the one or more parity dies.

20. The device of claim 15, wherein the instructions are further executable to, after encoding the data and the system data into the one or more symbols, delete the system data.

* * * * *